United States Patent [19]
Kustner

[11] Patent Number: 5,476,621
[45] Date of Patent: Dec. 19, 1995

[54] PROCESS FOR PRODUCING A FOAMED PRODUCT OR FOAM MADE OF UNMODIFIED STARCH

[75] Inventor: Franz Kustner, Hirschau, Germany

[73] Assignee: Naturpack GmbH, Germany

[21] Appl. No.: 215,780

[22] Filed: Mar. 22, 1994

[30] Foreign Application Priority Data

Mar. 24, 1993 [DE] Germany .................. 43 09 438.4
Jan. 7, 1994 [DE] Germany .................. 44 00 330.7

[51] Int. Cl.[6] .......................... B29C 44/20; B29C 44/56
[52] U.S. Cl. .............. 264/53; 264/148; 264/211.11; 264/211.13; 264/234; 425/209
[58] Field of Search ................. 264/51, 53, 148, 264/234, 50, 211.11, 211.13; 425/209, 4 C

[56] References Cited

U.S. PATENT DOCUMENTS

| | | | |
|---|---|---|---|
| 3,827,841 | 8/1974 | Kawai et al. | 425/4 C |
| 3,956,438 | 5/1976 | Schippers | 264/46.1 |
| 3,961,000 | 6/1976 | Ropiequet | 264/53 |
| 4,107,260 | 8/1978 | Dougherty | 264/54 |
| 4,869,911 | 9/1989 | Keller | 426/283 |

*Primary Examiner*—Allan R. Kuhns
*Attorney, Agent, or Firm*—Hoffman, Wasson & Gitler

[57] ABSTRACT

A process and device for producing a foamed product or foam made of unmodified starch is provided in which the starch is introduced through a feed opening into a treatment chamber containing a conveying device. The conveying device conveys the starch from the feed opening in an axial direction through the treatment chamber. The conveying device has an increasing effective cross section so that by increasing the volume, or by expansion foaming and/or break down of the starch is achieved. An outlet is provided at the other end of the treatment chamber for extruding the product.

9 Claims, 2 Drawing Sheets

PROCESS FOR PRODUCING A FOAMED PRODUCT OR FOAM MADE OF UNMODIFIED STARCH

BACKGROUND OF THE INVENTION

The invention relates to a process as well as to a device for breaking down or foaming starch or to a process and a device for producing a product or material, preferably a foam, by breaking down and/or foaming starch during extrusion.

A foam made of unmodified starch has already been proposed in particular for use as filling and packing material (DE-GM 92 12 899).

This foam, for which the most varied possible uses exist, has the advantage that it consists exclusively of an afterexpanding raw material and after use can also be disposed of without damage to the environment.

SUMMARY OF THE INVENTION

The object of the invention is to demonstrate a process as well as a device, with which the breaking down or foaming of starch or the production of a corresponding product, preferably also the production of a foam, i.e., also with low process engineering expense, especially also with low expenditure of energy, are economically possible.

To achieve this object, a process is designed in which unmodified starch is introduced through a feed opening into a foaming chamber, where it is Conveyed from the feed opening in an axial direction to the foaming chamber having an effective cross section which increases over the entire length of the chamber in the conveying direction, so that by increasing the volume of the unmodified starch, the foaming of the starch is achieved, and where an outlet opening is provided at an end of the chamber remote from the feeding opening for the extruded foamed product. The object is also achieved by the provision of a device having at least one chamber where the unmodified starch is introduced through a feed opening, and where a conveying device is located in the chamber to convey the starch from the feed opening in an axial direction through the chamber. The chamber increases in effective cross section in the conveying direction so that by increasing the volume of the starch, foaming of the starch is achieved, and on an end of the chamber remote from the feed opening, an outlet for extruding the product is provided.

In the case of the invention, the breaking down and/or foaming of the unmodified starch takes place by moving the latter by means of the conveyor through a treatment chamber, which exhibits an increasing effective cross section in the conveying direction, so that the starch is broken down and/or caused to foam by expansion or by increase of volume. On the conveyor as well as also on adjacent surfaces of the treatment chamber, preferably a contour is provided, which results in a physical change of the starch,by which the breaking down and foaming then take place in connection with expansion. Preferably corn grit is used as initial material or initial starch.

Different foam formation is possible as a function of the treatment of grain, corn or other unmodified starches. The foam formation or its stabilization is fostered by different viscosities.

The foams produced exhibit different properties and can thus be used in the mast varied way. It is also critical for the properties, i.e., whether the foams were produced at higher or lower pressure.

Further developments of the invention are the object of the subclaims.

The invention is explained in more detail below based on the figures in an embodiment.

Figure 1:
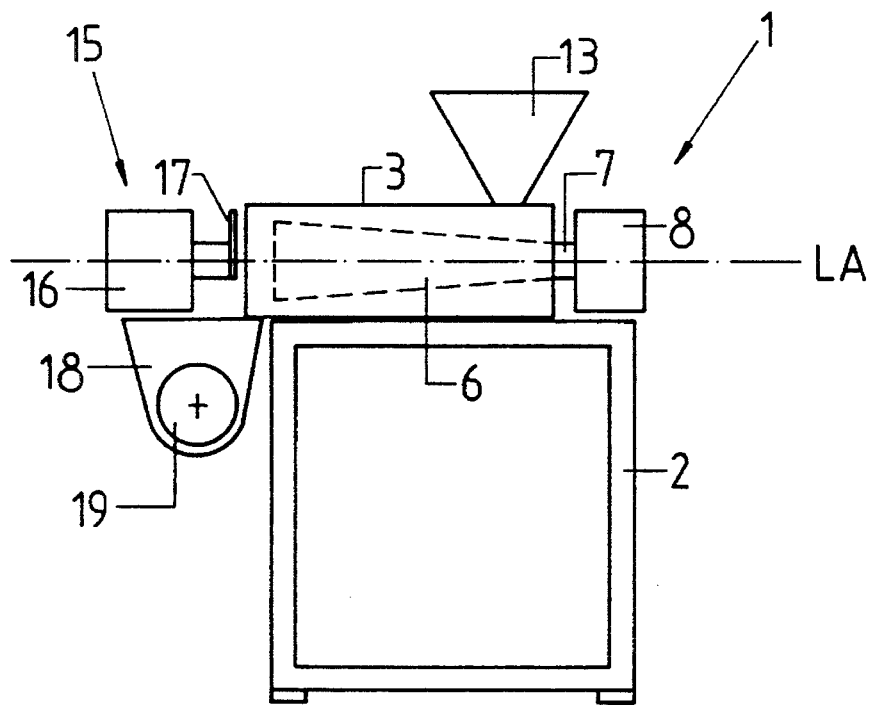
FIG. 1 shows a device according to the invention in a diagrammatic representation and in a side view.
Figure 3:
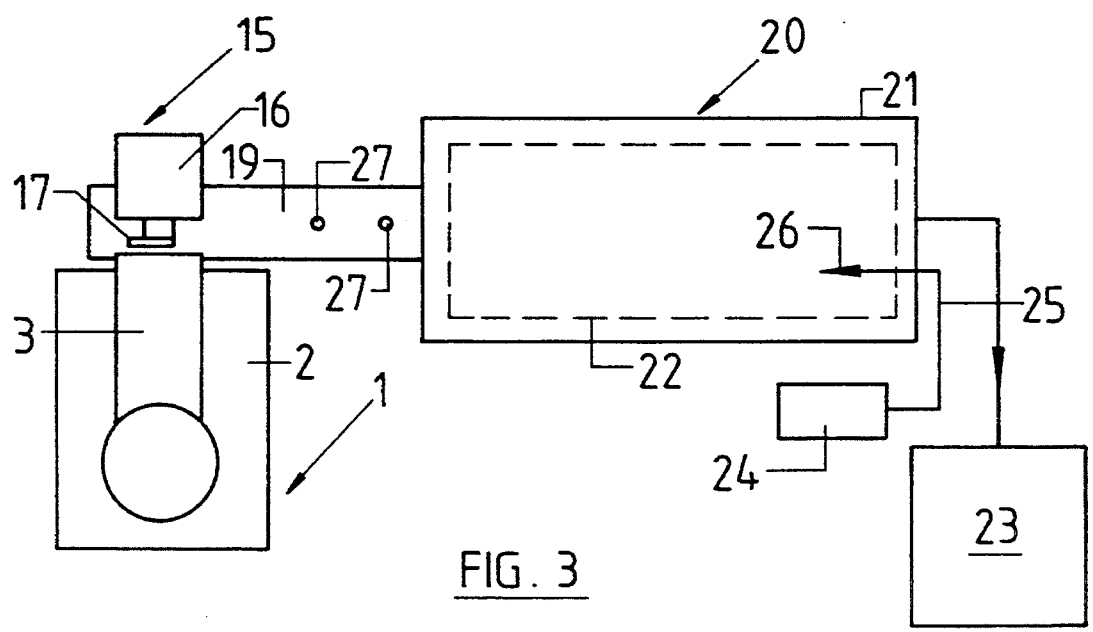
FIG. 3 shows a production unit including the device according to the invention for producing a foamed material made of starch, in a block diagram and in top view.

In the figures, 1 is a device which is part of a total device or production unit for producing a foamed foam, suitable, for example, as filling or packing material or as insulating material, made of unmodified starch, for example, of corn grit. Device 1 consists of a table-like machine frame 2, in which additional operating elements of the unit are housed and on whose top side an extruder device 3 is placed. The latter consists, corresponding to FIG. 2, in particular, of a housing 4, in which a cone-shaped opening 5 (treatment chamber) is provided which widens toward one end, i.e., in the representation selected for FIG. 2, to the left end there, and which extends in the direction of the horizontal housing longitudinal axis LA. Inside opening 5 is a screw 6 which lies with its axis coaxial to longitudinal axis LA and which is matched to the shape of this opening. On the end of right screw 6 in FIG. 2, on which this screw as well as opening 5 exhibit the smaller diameter, screw 6 is connected by shaft 7 with a drive 8.

Figure 2:
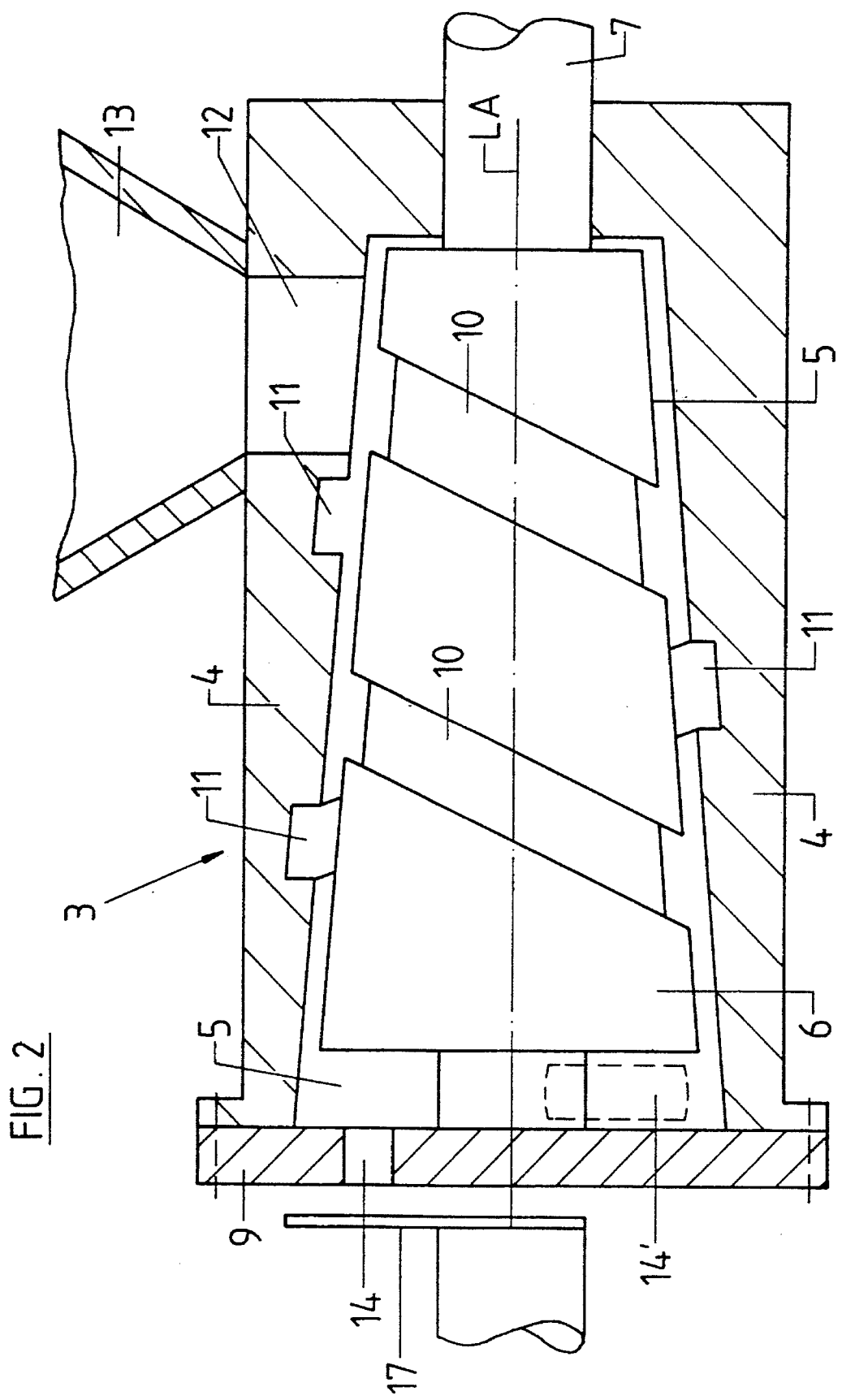
FIG. 2 shows the extruder of the device according to FIG. 1 in enlarged representation in section.

In the area of the left end in FIG. 2, on which screw 6 and also opening 5 respectively exhibit the larger diameter, screw 6 is freely pivoted in a plate 9 around axis LA, which (plate) seals off opening 5 on the end there. On the right end in FIG. 2, opening 5 is closed by housing 4. With its left end, screw is spaced at a distance from the inner surface of plate 9.

Screw 6, whose screw element is designed like a truncated cone, is provided on its periphery with an external thread 10. A corresponding internal thread 11 is provided on the inner surface of opening 5 enclosing screw 6.

In particularly, the ratio D:L, i.e., the ratio of the maximum screw diameter to the length of the screw, is 1:5. External thread 10 is a quadruple right-hand thread and has a profile corresponding to a tapestry thread.

Internal thread 11 is a double left-hand thread with a round runout.

A feed opening 12, which is connected with the interior of feeding hopper 13 which is provided on the upper side of housing 4, ends in the area of the smaller diameter of opening 5.

Several openings 14, which are used as outlets, are provided in plate 9. Outside of extruder 3 a cutting device 15 is provided in the area of outlets 14, the device essentially consisting of a drive motor 16 and a cutting knife 17. Below outlets 14 and cutting device 15, a collecting hopper 18 of a screw conveyor 19 is provided with which the material which had left device 1 or extruder device 3 is conveyed to an aftertreatment device 20. The latter essentially consists of a treatment winding drum 22 placed in a sealed housing or tunnel 21 the drum being pivoted around an axis somewhat inclined, for example, relative to the horizontal, and it can be driven around this axis. The material delivered by the device is fed tone end of drum 22 by conveyor 19. After treatment, this material leaves drum 22 at the other end and passes via a conveying device which is not indicated to a storage bin 23, which also exhibits a filling device for filling, for example, bagging, the material.

A steam generator, i.e., a device to generate steam, is designated by 24. Via line 25 the steam is fed to the interior of aftertreatment device 20, where the steam exits in the area of or inside drum 22 at at least one nozzle 26. In the embodiment shown, nozzle 26 is provided in the area of the end of drum 22, at which the material delivered by device 1 is fed to this drum.

Housing 21 sealed toward the outside has, for example, a length of 7 m and a height as well as width of about 2.5 m. Drum 22 is shaped hexagonally in cross section, namely with an inscribed circle diameter or lateral length of about 1.5 m and a length of about 6.5 m. The conveying action is achieved by baffle plates placed inside the drum.

To produce material 27, unmodified starch in the form of corn grit with a certain portion of water is fed through hopper 13 to device 1. This starch material passes through feed opening 12 into the interior of extruder device 3 or to opening 5. In the case of rotationally driven screw 6, the material is physically changed by threads 10 and 11 provided on the outside surface of screw 6 as well as on the inside surface of opening 5 and by the relative motion of thread 10 to thread 11, such that in connection with the unloading or expansion which arises due to the cross section of opening 5 which increases toward plate 9, a foaming of the starch is achieved, so that a foamed material which is extruded through outlets 14 is produced at the end of screw 6. The strand of the foamed starch material forming in this connection on the outside of plate 9 in the area of each outlet 14 is cut into short sections by cutting device 15, so that essentially pellet- or granular-type elements 27 of the foamed material are produced. These elements or this pellet-type material is then fed by conveyor 19 to aftertreatment device 20. There the pellet-type foamed material is treated with the steam delivered from steam generator 24 and as a result converted to an elastic state.

Pellet-type material 27 can be used as filling and packing material either in this pellet-type form or as bulk material. Furthermore, it is also possible to press pellet-type material 27 in a mold into a molded part, namely, for example, with addition of a biological binder, for example, casein, cellulose, resin. Furthermore, agglutination of the pellet-type material is also possible using water or steam to produce molded parts from material 27.

The invention was described above in one embodiment. It goes without saying that changes as well as modifications are possible, without thereby abandoning the basic idea of the invention.

Thus, it is possible, for example, instead of front-side outlet 14 which is provided on plate 9, to provide at least one radial outlet which is then, as represented in FIG. 2 with the broken lines at 14', located radially to longitudinal axis LA laterally on the housing and ends in opening 5, where the left end of screw 6 in FIG. 2 is spaced at a distance from the inside of plate 9. Also, a cutting device corresponding to cutting device 15 is provided on lateral outlet 14' of this type, with which a higher output for device 1 can be achieved.

I claim:

1. A process for producing a foam made of unmodified starch, comprising the steps of: introducing said unmodified starch through at least one feed opening (12) into a foaming chamber (5), in which at least one conveying device (6) is provided which conveys the starch from feed opening (12 in an axial direction (LA) through foaming chamber (5), having an effective cross section, which increases in a starch conveying direction over the entire length of said foaming chamber in said axial direction, so that by increasing said effective cross section, foaming of the starch is achieved, and providing at one end of said foaming chamber (5) remote from the feed opening, at least one outlet (14, 14') and extruding the foamed product from said at least one outlet.

2. A process according to claim 1, wherein a screw (6) rotating around a longitudinal axis (LA) of foaming chamber (5) is used as said conveying element.

3. A process according to claim 2, wherein said screw (6) as well as foaming chamber (5) are disposed at least in a partial area of the foaming chamber such that the diameter of the screw as well as of the foaming chamber increases continuously and/or in stages in the conveying direction.

4. A process according to claim 2 wherein said screw (6) and foaming chamber (5) widen conically or in the manner of a truncated cone.

5. A process according to claim 1, wherein conveying device (6) as well as the foaming chamber are provided with a thread (10, 11) or a contour on a surface adjacent to the conveying device.

6. A process according to claim 1, wherein the extruded and foamed product is pelleted or granulated by a cutting device (15).

7. A process according to claim 1, wherein the extruded and foamed product is treated with steam.

8. A process according to claim 1, wherein corn grit is used as initial material.

9. A process for producing a foamed product made of unmodified starch, comprising the steps:

introducing said unmodified starch through at least one feed opening (12) into a foaming chamber (5), in which at least one conveying device (6) is provided which conveys the starch from said at least one feed opening (12) in an axial direction (LA) through the foaming chamber (5) which in a starch conveying direction exhibits an increasing effective cross section such that by increasing said effective cross section, foaming of the starch is achieved;

providing at one end of said foaming chamber (5) remote from said at least one feed opening (12), at least one outlet and extruding the foamed product from said at least one outlet; and treating the extruded foamed product with steam.

* * * * *